United States Patent
Van Oyen et al.

(10) Patent No.: US 7,837,054 B2
(45) Date of Patent: Nov. 23, 2010

(54) TANK SEAL

(75) Inventors: Johannes Van Oyen, Yorba Linda, CA (US); Mark Warner, Frederick, CO (US); Mark Leavitt, Orange, CA (US); Ken Newell, Irvine, CA (US)

(73) Assignee: Quantum Fuel Systems Technologies Worldwide, Inc., Irvine, CA (US)

( * ) Notice: Subject to any disclaimer, the term of this patent is extended or adjusted under 35 U.S.C. 154(b) by 420 days.

(21) Appl. No.: 11/234,556

(22) Filed: Sep. 23, 2005

(65) Prior Publication Data
US 2006/0065676 A1 Mar. 30, 2006

Related U.S. Application Data

(60) Provisional application No. 60/613,075, filed on Sep. 23, 2004.

(51) Int. Cl.
*B65D 53/02* (2006.01)
(52) U.S. Cl. .................. 220/378; 220/806; 220/601; 220/582
(58) Field of Classification Search .......... 220/378, 220/601, 806, 581, 586, 592
See application file for complete search history.

(56) References Cited

U.S. PATENT DOCUMENTS

| | | | | |
|---|---|---|---|---|
| 3,298,794 A | * | 1/1967 | Mikesell, Jr. et al. | 422/242 |
| 3,686,073 A | * | 8/1972 | Baefuss | 435/289.1 |
| 4,369,893 A | * | 1/1983 | Pennell et al. | 220/378 |
| 4,565,297 A | * | 1/1986 | Korner et al. | 220/582 |
| 4,589,564 A | | 5/1986 | Olster et al. | |
| 5,174,463 A | * | 12/1992 | Scharrer | 220/203.26 |
| 5,984,138 A | * | 11/1999 | Olson | 220/801 |
| 7,296,474 B2 | * | 11/2007 | Shamine | 73/729.2 |

FOREIGN PATENT DOCUMENTS

WO WO-2006/034439 A2 3/2006

OTHER PUBLICATIONS

International Search Report mailed Feb. 6, 2008, for PCT Application No. PCT/US05/34124, three pages.

\* cited by examiner

*Primary Examiner*—Anthony Stashick
*Assistant Examiner*—James N Smalley
(74) *Attorney, Agent, or Firm*—Morrison & Foerster LLP

(57) ABSTRACT

The present invention is directed to a seal system for sealing a storage tank such as a liquid or air storage tank. In accordance with the preferred embodiment, the seal system includes a radial valve body that is disposed within a circular spring energizer, together which are disposed within a boss member. The spring energizer and the boss member are separated by a non-bonded liner. Various radial seal members are placed within the inner surface of the boss member to ensure the seal, and the seal system is installable to the top portion of a liner of a storage tank.

4 Claims, 7 Drawing Sheets

TANK SEAL

BACKGROUND

The preferred embodiments of the present invention are directed to a sealing system for sealing pressurized tanks.

SUMMARY OF THE INVENTION

The present invention is directed to sealing systems for the sealing of pressurized storage tanks such as hydrogen storage tanks, which can be used in various applications such as hydrogen-powered vehicles and ground-based storage tanks. The sealing system can be used in conjunction with a variety of different types of pressurized tanks, including the 35 and 70 MPa Hydrogen storage tanks currently manufactured by Quantum Fuel Systems Technologies Worldwide, Inc for use with Internal Combustion Engine (ICE) and Fuel Cell applications. The spring-energized sealing system provides effective sealing for tanks that store contents up to 10,000 psi and above.

DETAILED DESCRIPTIONS OF THE PREFERRED EMBODIMENTS

FIGS. 1-5 show various illustrations of spring-energized tank sealing system in accordance with preferred embodiments of the present invention.

Figure 1A:
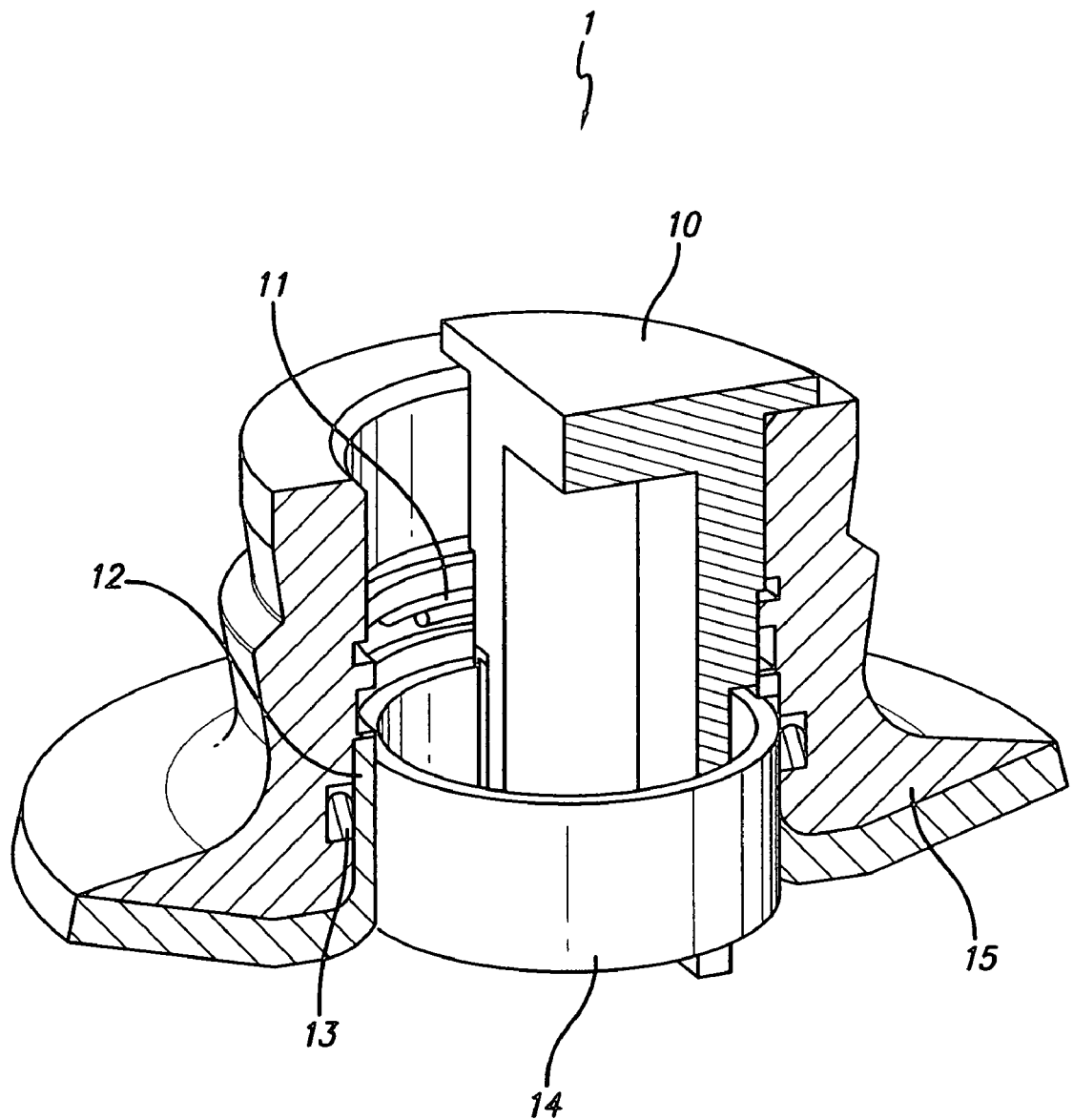
FIG. 1A is a schematic diagram of a spring energized tank seal system in accordance with a preferred embodiment of the present invention.

FIG. 1A illustrates a seal system in accordance with the preferred embodiment of the present invention. As shown in FIG. 1A, a seal system 1 in accordance with the preferred embodiment includes a valve body 10, a valve body radial seal 11, a non-bonded liner 12, a boss member 15, a boss-to-liner external radial seal 13, and a spring energizer member 14. As shown in FIG. 1A, the valve body 10 includes a lip portion that overlaps a top portion of the boss member.

Figure 1B:
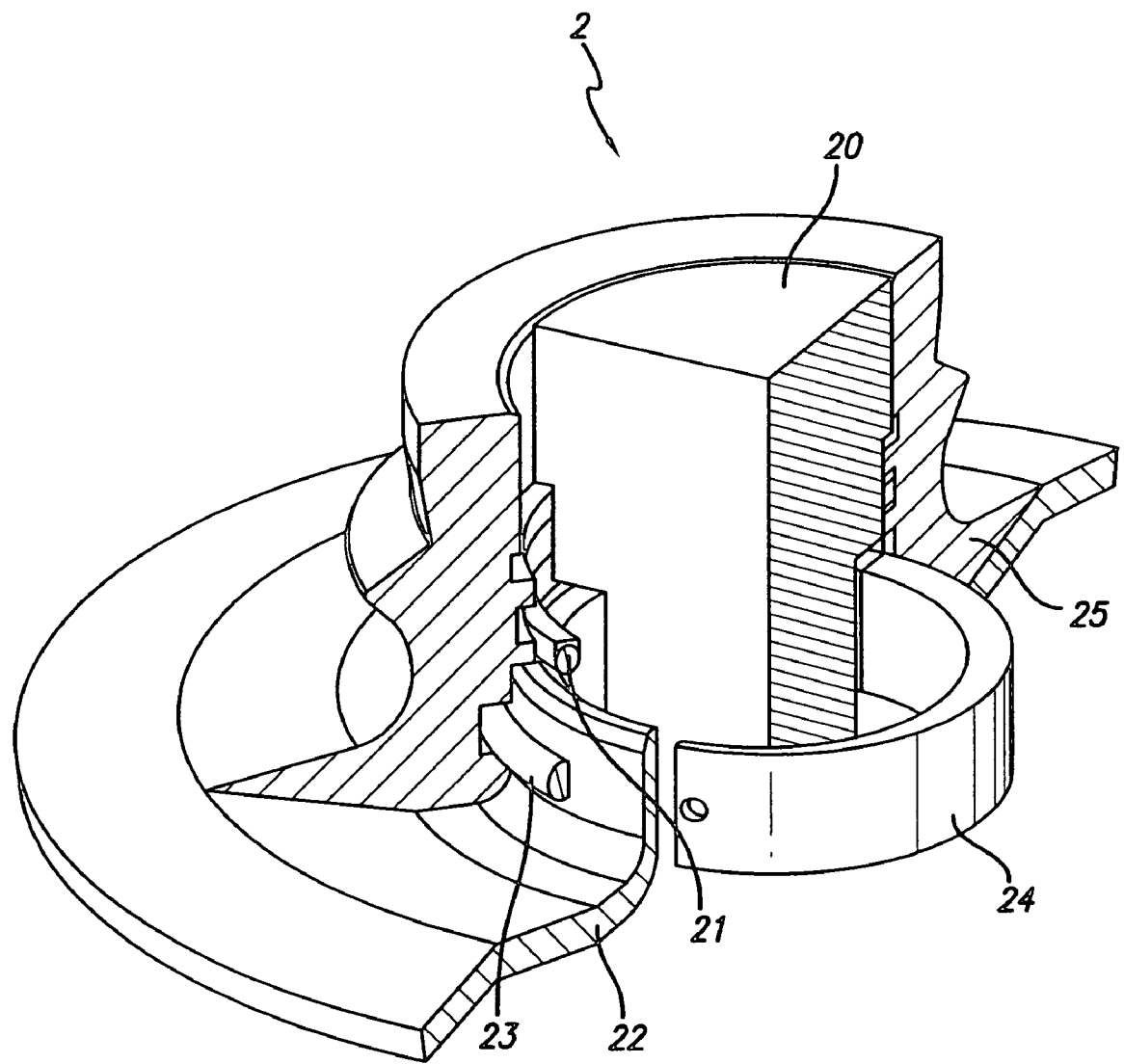
FIG. 1B is a schematic diagram of a spring energized tank seal system in accordance with another embodiment of the present invention.

FIG. 1B illustrates a seal system 2 in accordance with another embodiment of the present invention. Specifically, the seal system 2 includes a valve body 20, a boss member 25, a spring energizer member 24, a boss-to-liner external radial seal 23, a non-bonded liner 22, and valve body radial seal 21.

Figure 2:
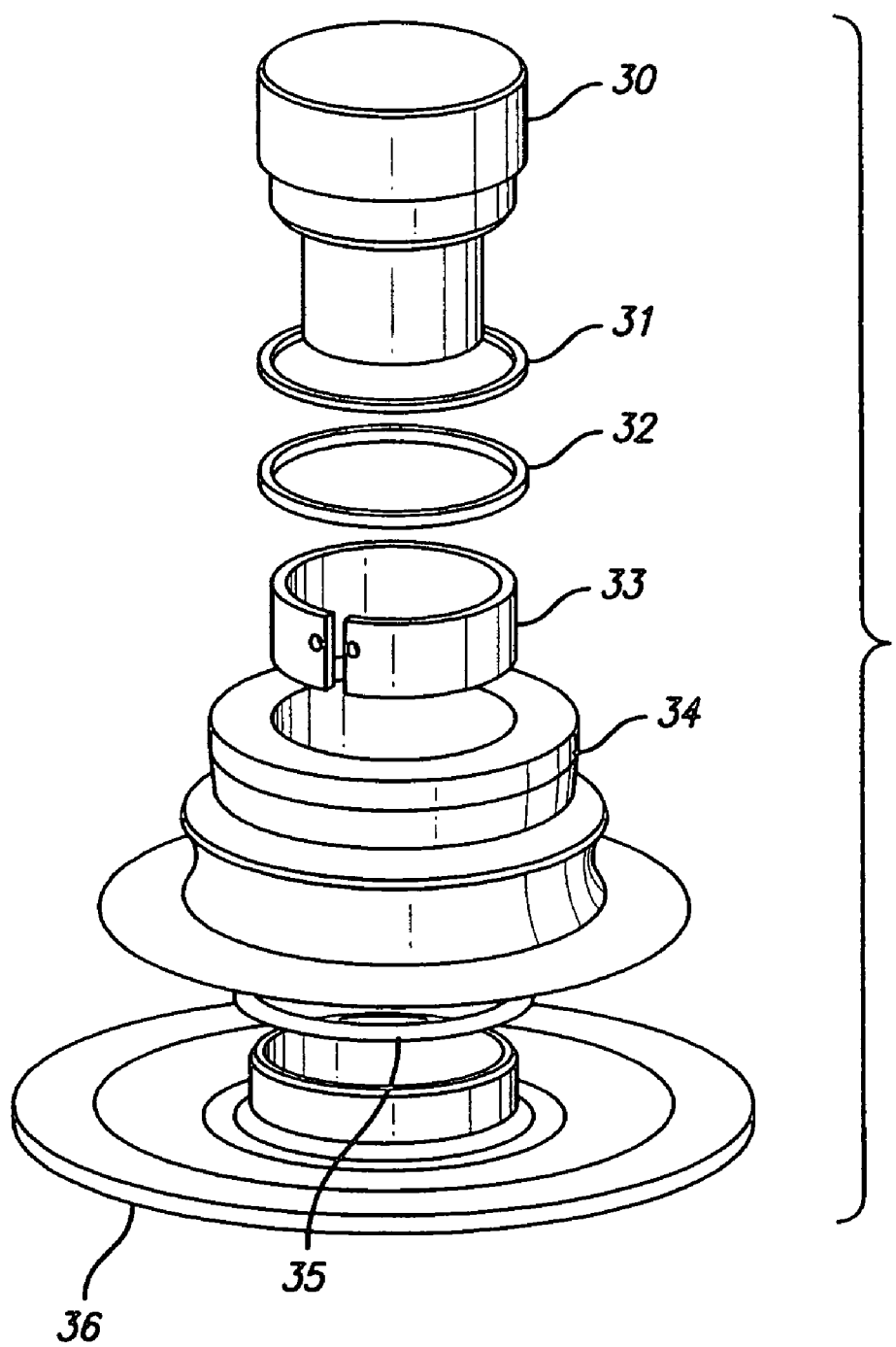
FIGS. 2-3 are exploded schematic diagrams of the spring energized tank seal system of FIG. 1B.
Figure 3:
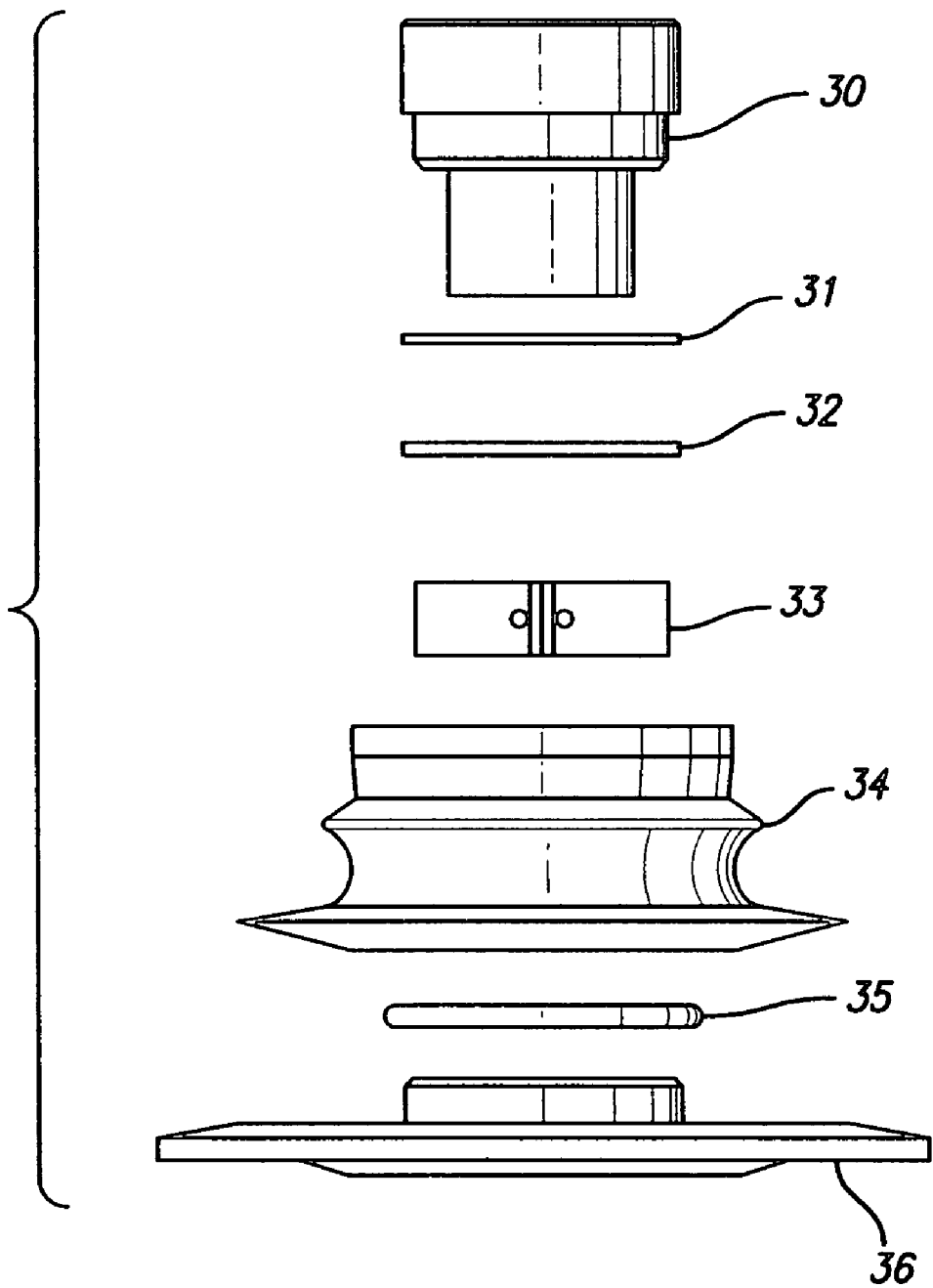

FIGS. 2 and 3 are blow-up illustrations of a seal system 3 in accordance with the embodiments of FIGS. 1A and 1B, showing the valve body 30, valve body backup seal 31, valve body seal 32, spring retainer 33, boss member 34, boss-to-liner seal 35, and the top portion of liner 36.

As an external seal system, increased tank pressure can help with seal activation, providing efficient sealing of the tanks. The spring-energized component of the sealing system help ensure that the liner is in constant contact with seal, compensating for creep and thermal expansion that may be caused by extreme tank operating temperatures and pressure; the spring-energized aspect of the sealing system can also be used to control joint integrity during the manufacturing of the tank.

The non-bonded liner to boss member (shown in the figures) used by the sealing system allows for the use of liner material with poor and/or no bonding characteristics so as to avoid bonding (chemical or mechanical) to the boss surface, while preserving the sealing integrity.

It should be noted that the sealing systems are preferably elastomers (EPDM), and are preferably outfitted outside of the tank (not shown in the drawings).

Figure 4:
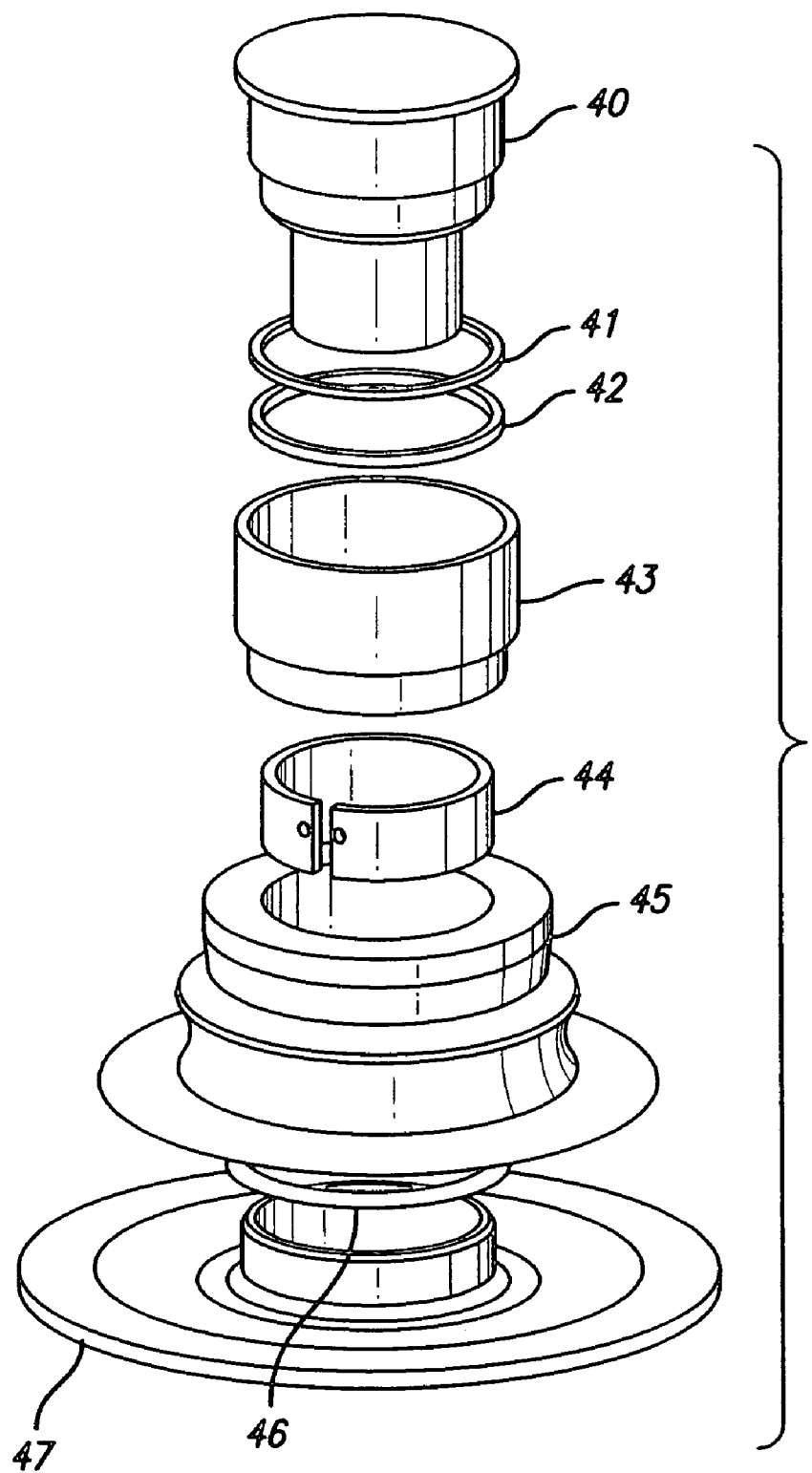
FIGS. 4-5 are exploded schematic diagrams of a removable spring energized tank seal system in accordance with yet another embodiment of the present invention.
Figure 5:
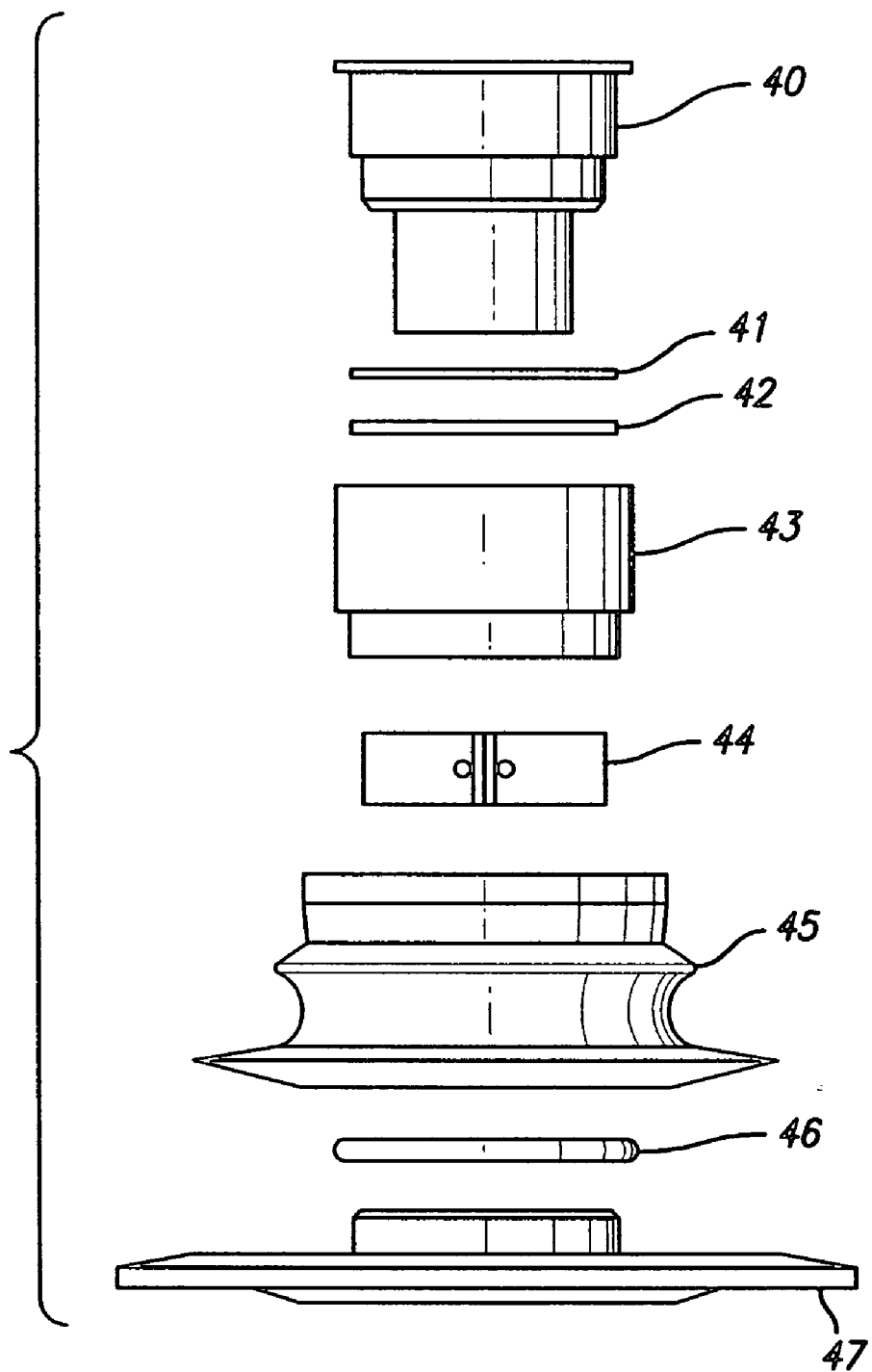
Figure 6:
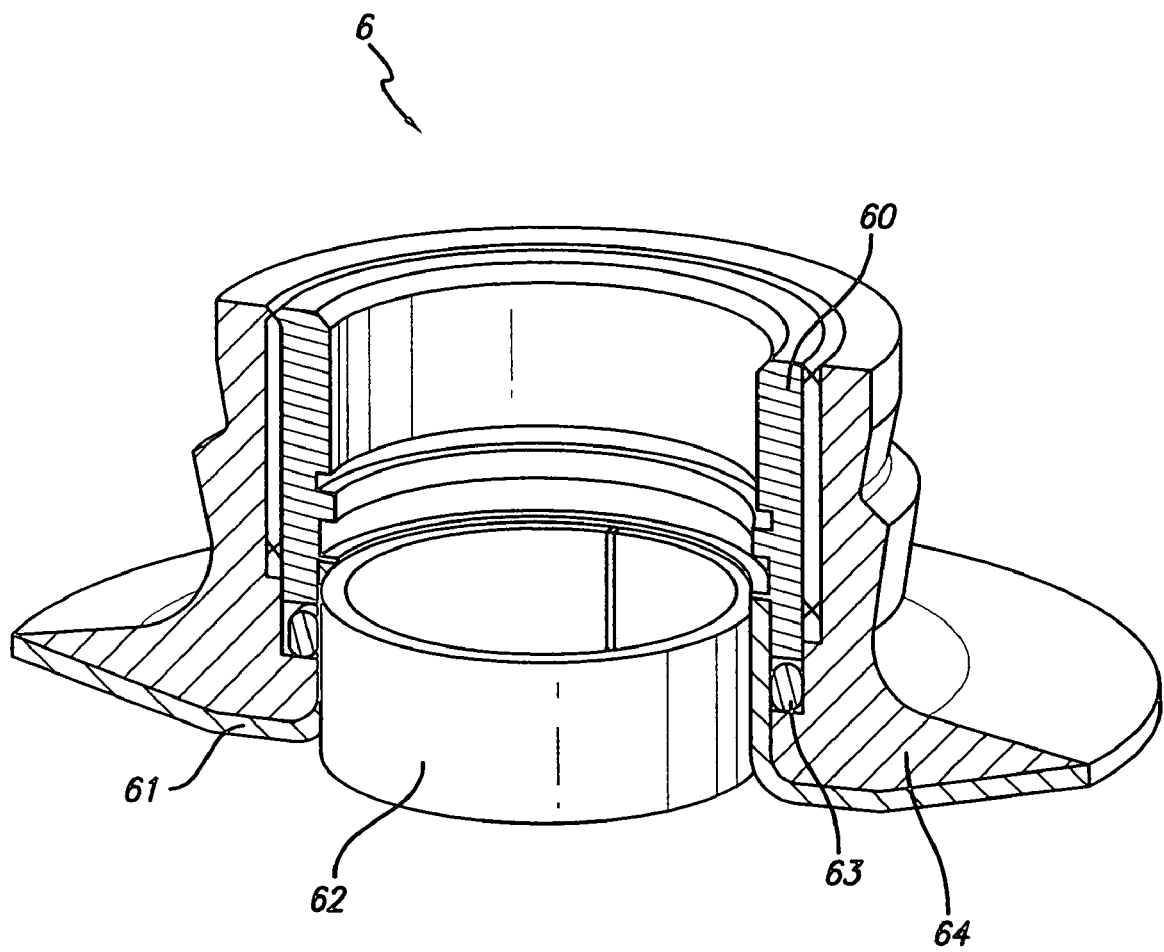
FIG. 6 is a schematic diagram of a portion of the removable spring energized tank seal system of FIGS. 4-5.

FIGS. 4-6 illustrate a spring-energized sealing system that is removable from the tank so as to allow for the repair/replacement of sealing components or for purposes of inspection of the sealing components.

Specifically, FIG. 6 illustrates a seal system 6 in accordance with yet another embodiment of the present invention showing a seal retainer 60, a non-bonded liner 61, a spring energizer 62, a boss-to-liner external radial seal 63, and boss member 64.

FIGS. 4 and 5 are blow-up illustrations of a removable seal system 4 in accordance with an embodiment such as one shown in FIG. 6. Specifically, FIG. 6 shows a valve body 40, valve body backup seal 41, valve body seal 42, seal retainer 43, spring retainer 44, boss member 45, boss-to-liner seal 46, and top portion of the liner 47.

What we claim:

1. A seal system for the sealing of a storage tank, said sealing system comprising:
   a valve body;
   a boss member, said valve body being fixable within the boss member;
   a spring energizer member, said spring energizer member fixable within the boss member and surrounding the valve body;
   a non-bonded liner disposed between the spring energizer member and the boss member; and
   a boss-to-liner external radial seal disposed between the boss member and the non-bonded liner within an inner groove of the boss member, the boss-to-liner external radial seal operative to seal in a radial direction with respect to an axis of the valve body,
   wherein the spring energizer member is configured to ensure that the non-bonded liner is in constant contact with the boss-to-liner external radial seal.

2. The seal system according to claim 1, further comprising a valve body radial seal, said valve body radial seal being disposed within a second inner groove of said boss member in parallel relation to said boss-to-liner external radial seal.

3. A removable seal system for sealing a storage tank, said removable seal system comprising:
   a valve body;
   a boss member;
   a seal retainer, said seal retainer disposed within said boss member, said valve body fixable within the seal retainer;
   a spring energizer member, said spring energizer member fixable within the boss member and surrounding the valve body; and
   a non-bonded liner disposed between the spring energizer member and the boss member; and
   a boss-to-liner external radial seal disposed between the boss member and the non-bonded liner within an inner groove of the boss member, the boss-to-liner external radial seal operative to seal in a radial direction with respect to an axis of the valve body, wherein the spring energizer member is configured to ensure that the non-bonded liner is in constant contact with the boss-to-liner external radial seal.

4. The removable seal system according to claim 3, further comprising a valve body radial seal, said valve body radial seal being disposed within a second inner groove of said boss member in parallel relation to said boss-to-liner external radial seal.

* * * * *